US 6,672,965 B2

(12) United States Patent
Hildebrandt et al.

(10) Patent No.: US 6,672,965 B2
(45) Date of Patent: Jan. 6, 2004

(54) CONSTANT VELOCITY FIXED BALL JOINT AS A COUNTER TRACK JOINT

(75) Inventors: Wolfgang Hildebrandt, Siegburg (DE); Stephan Maucher, Siegburg (DE); Thomas Weckerling, Lohmar (DE); Hans Wormsbächer, Lake Orion, MI (US)

(73) Assignee: GKN Automotive GmbH, Lohmar (DE)

( * ) Notice: Subject to any disclaimer, the term of this patent is extended or adjusted under 35 U.S.C. 154(b) by 68 days.

(21) Appl. No.: 10/017,808

(22) Filed: Nov. 30, 2001

(65) Prior Publication Data

US 2002/0128079 A1 Sep. 12, 2002

(30) Foreign Application Priority Data

Dec. 4, 2000 (DE) ........................... 100 60 118

(51) Int. Cl.$^7$ .............................. F16D 3/223
(52) U.S. Cl. ...................... 464/145; 464/906
(58) Field of Search .................. 464/139, 143, 464/145, 906

(56) References Cited

U.S. PATENT DOCUMENTS

| 3,475,924 | A | * | 11/1969 | Aucktor | 464/144 |
|---|---|---|---|---|---|
| 4,156,353 | A | * | 5/1979 | Welschof | 464/145 |
| 4,494,941 | A | * | 1/1985 | Hirai et al. | 464/145 |
| 4,533,339 | A | * | 8/1985 | Girguis | 464/146 |
| 4,820,240 | A | * | 4/1989 | Girguis | 464/145 |
| 5,221,233 | A | * | 6/1993 | Jacob | 464/145 |
| 6,186,899 | B1 | * | 2/2001 | Thomas et al. | 464/145 |

FOREIGN PATENT DOCUMENTS

| DE | 40 31 819 C1 | 3/1992 |
|---|---|---|
| DE | 44 03 591 C1 | 4/1995 |
| DE | 40 42 390 C2 | 7/1995 |
| DE | 198 31 011 C1 | 3/2000 |
| JP | 11 190355 | 7/1999 |

* cited by examiner

*Primary Examiner*—Lynne H. Browne
*Assistant Examiner*—Kenn Thompson

(57) ABSTRACT

A constant velocity fixed ball joint in the form of a counter track joint, having an outer joint part with outer tracks, an inner joint part with inner tracks, torque transmitting balls which are received in pairs of tracks consisting of outer tracks and inner tracks, and a ball cage with cage windows in which the balls are held in a common plane and are guided on to the angle-bisecting plane when the joint is articulated. First outer tracks, together with first inner tracks, form pairs of tracks whose control angles open in a first axial direction and in which first balls are held. Second outer tracks, together with second inner tracks, form pairs of tracks whose control angles open in a second axial direction and in which second balls are held. The control angles are defined as angles between the tangents at the ball contact points in the tracks. The outer joint part, on its inside, forms a stop-and-guiding face for a spherical outer face of the ball cage. The stop-and-guiding face is undercut-free if viewed in the second axial direction ($R_2$). The ball cage, on its inside, forms a stop-and-guiding face for a spherical outer face of the inner joint part. The stop-and-guiding face is undercut-free if viewed in the first axial direction ($R_1$).

18 Claims, 2 Drawing Sheets

CONSTANT VELOCITY FIXED BALL JOINT AS A COUNTER TRACK JOINT

TECHNICAL FIELD

The present invention relates to constant velocity joints and more particularly, concerns constant velocity joints of the counter track type.

BACKGROUND OF THE INVENTION

Constant velocity fixed ball joints in the form of a counter track joint, having an outer joint part with outer tracks, an inner joint part with inner tracks, torque transmitting balls which are received in pairs of tracks consisting of outer tracks and inner tracks, and a ball cage with cage windows in which the balls are held in a common plane and are guided on to the angle-bisecting plane when the joint is articulated are such joints, in which first outer tracks, together with first inner tracks, form first pairs of tracks whose control angles open in a first axial direction $R_1$ and in which tracks first balls are held and in which second outer tracks, together with second inner tracks, form second pairs of tracks whose control angles open in a second axial direction $R_2$ and in which tracks second balls are held. The control angles are defined as angles between the tangents at the ball contact points in the tracks.

With constant velocity fixed ball joints of this type, provision is generally made for the outer face of the cage and/or the inner face of the cage be approximately spherical in shape for the purpose of being supported relative to the outer joint part and/or the inner joint part. Such joints are described in DE 40 31 819 C1 and DE 40 42 390 C2 for example. Before such joints are assembled, the outer joint part is first broken into two halves which, after assembly, are held together by a sleeve.

Machining the outer joint part and the cage, which is in the form of spherical portions, is very complicated, and the same applies to the assembly operation.

It would therefore be desirable to provide a joint of the foregoing type which permits a simplified type of machining and assembly.

SUMMARY OF THE INVENTION

A constant velocity fixed ball joint having improved assembly and simplified manufacturability is provided. In the constant velocity fixed ball joint disclosed, the outer joint part, on its inside, forms a stop-and-guiding face for a spherical outer face of the ball cage. The stop-and-guiding face is undercut-free if viewed in the second axial direction $R_2$. Furthermore, the ball cage, on its inside, forms a stop-and-guiding face for a spherical outer face of the inner joint part. This stop-and-guiding face is undercut-free if viewed in a first axial direction $R_1$.

In one embodiment, in the first axial direction $R_1$, the ball cage, by way of its cage windows, is supported on the second balls held in the second outer tracks and in the second inner tracks. Also, in the second axial direction $R_2$, the inner joint part, by way of its second inner tracks, is supported on the second balls axially held in the cage windows of the ball cage.

The disclosed joint is particularly advantageous in that the cage, as a result of being undercut-free in its interior, is easy to produce. For example, the cage can be manufactured by non-cutting forming, using a punch. In addition, the guiding faces in the outer joint part for the ball cage are undercut-free, which, at least as far as the guiding face in the outer joint part is concerned, allows a simplified method of production by a non-chip producing forming operation. According to another embodiment, to the extent that at least part of the tracks are undercut-free, it is advantageous for the undercut-free tracks in the outer joint part to be arranged in the same direction as the undercut-free stop-and-guiding face for the ball cage, so that a substantial part of the inner surface of the outer joint part can be produced with a one-piece inner punch by a non-chip producing forming operation.

The characteristics of the present joint permit a largely simplified joint assembly. Thus, the ball cage with one half of the balls having been inserted, and the inner joint part, can be slid in as a preassembled group in a coaxial position into the outer joint part. The half of inserted balls refers to the first balls held in the first outer tracks and in the first inner tracks. For mounting the second balls held in the second outer tracks and in the second inner tracks, the usual method of over-articulating the joint and of individually inserting the second balls from the outside into the cage windows projecting from the outer joint part is employed. After all of the balls have been mounted, the joint is axially fixed without requiring any additional structures.

Other advantages of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

Figure 1A:
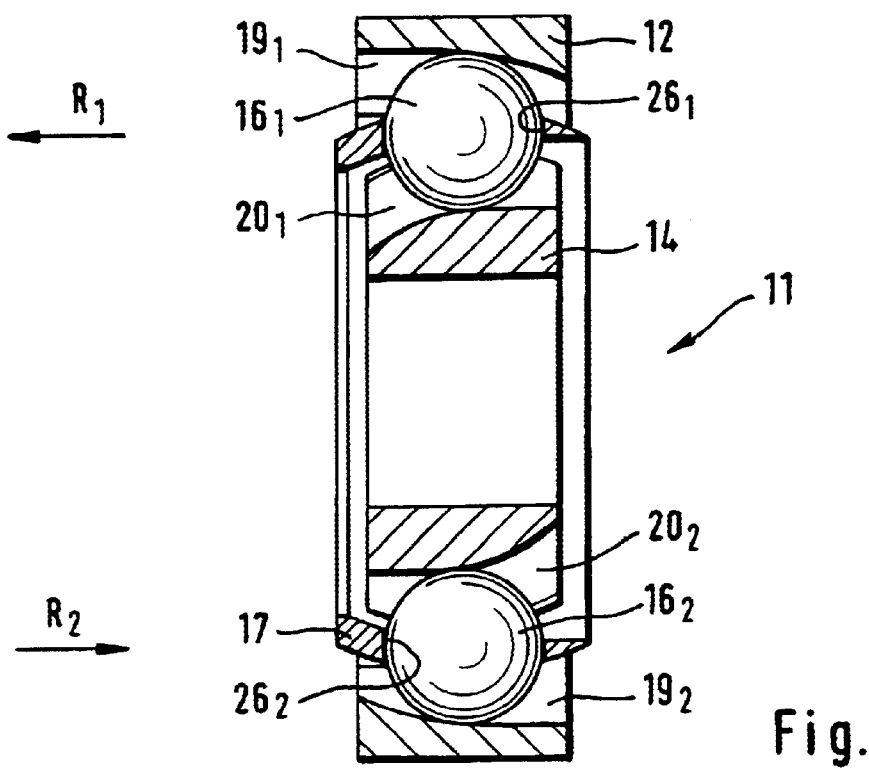
FIG. 1 shows an inventive fixed joint in a first embodiment in the form of a disc joint: (a) in a longitudinal section through a plane extending through ball tracks, (b) in a longitudinal section through a plane between ball tracks.
Figure 1B:
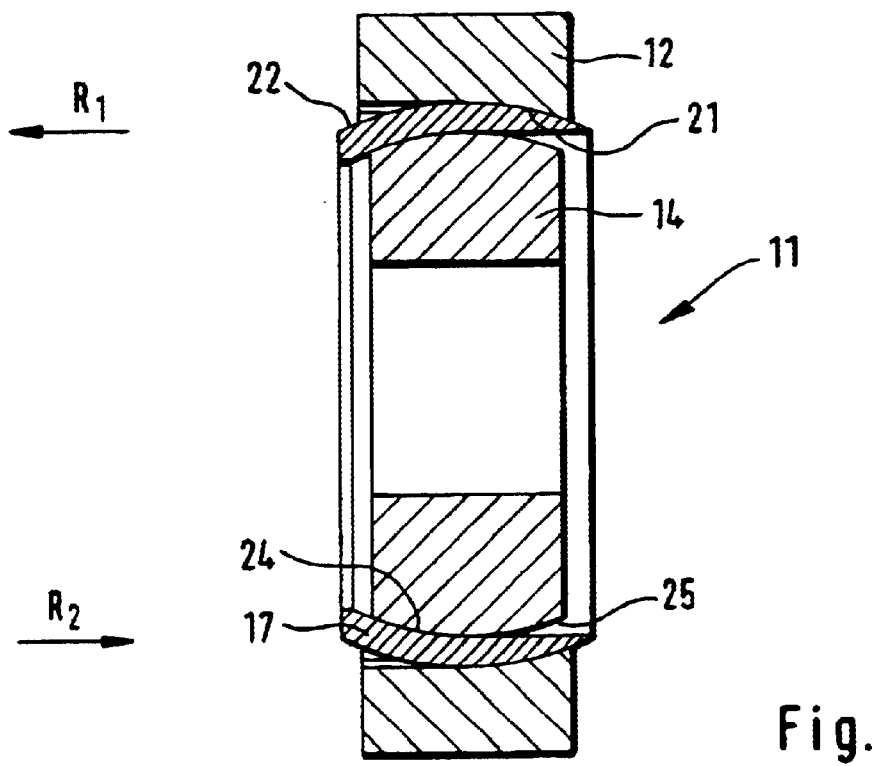

In the description that follows, the two illustrations of FIG. 1 will be described jointly. FIG. 1 shows an inventive constant velocity fixed joint 11 having an outer joint part 12, an inner joint part 14, balls $16_1$, $16_2$ and a ball cage 17. The joint is provided in the form of a counter track joint. Thus, first outer ball tracks 19i in the outer joint part 12 and first inner ball tracks $20_1$ in the inner joint part 14, which tracks hold balls $16_1$, are designed axially oppositely to second outer ball tracks $19_2$ in the outer joint part and second inner ball tracks $20_2$ in the inner joint part 14, which tracks hold the second balls $16_2$. The tracks 19,20 are all undercut-free if viewed in an axial direction. The counter-track formation is provided in that the centers of curvature of the track center lines, which extend parallel to the illustrated track base lines, in each of the components 12, 14, are circumferentially alternately offset in the opposite axial direction relative to the central joint plane which is defined by the centres of the balls 16 when the joint is in the aligned position.

In the outer joint part 12 there is provided a stop-and-guiding face 21 for the spherical outer face 22 of the ball cage 17. The stop-and-guiding face 21 is undercut-free if viewed in a second axial direction $R_2$ from left to right. The ball cage 17, in turn, on its inside, forms an inner stop-and-guiding face 24 for the spherical outer face 25 of the inner joint part 14. The stop-and-guiding face 24 is undercut-free if viewed in a first axial direction $R_1$ from right to left. In this way, the inner joint part 14 can be moved into the ball cage 17 from right to left in a coaxial position. Furthermore, the ball cage 17 can be inserted into the outer joint part in a coaxial position from the left. As can be seen from the shape of the tracks, it is thus possible for the outer joint part 12, the ball cage 17 and the inner joint part 14 to be inserted coaxially into one another, with the first balls $16_1$ being held in the windows $26_1$ of the ball cage 17, whereas the second balls $16_2$ are subsequently mounted in a known way by over-articulating the joint. Thus, it is necessary to provide excessively large articulation angles between the inner joint part 14 and the outer joint part 12, with the windows $26_2$ provided for receiving the second balls $16_2$ fully emerging from the tracks of the outer joint part. The joint of the type as illustrated is axially secured after all the balls $16_1$, $16_2$ have been inserted without there being any need for further securing devices. The joint 11 is provided in the form of a disc joint whose outer joint part can be bolted to an annular flange.

Figure 2A:
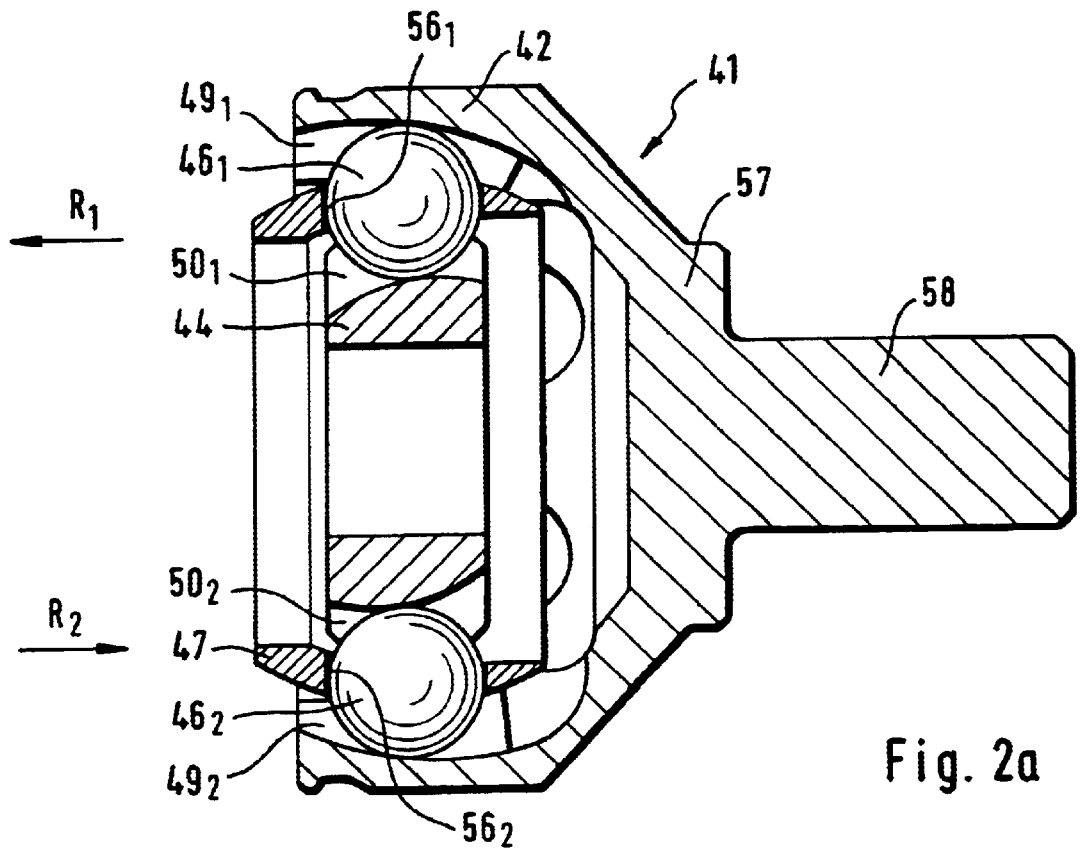
FIG. 2 shows an inventive fixed joint in a second embodiment with a one-piece bell-shaped outer joint part: (a) in a longitudinal section through a plane extending through ball tracks, (b) in a longitudinal section through a plane between ball tracks.
Figure 2B:
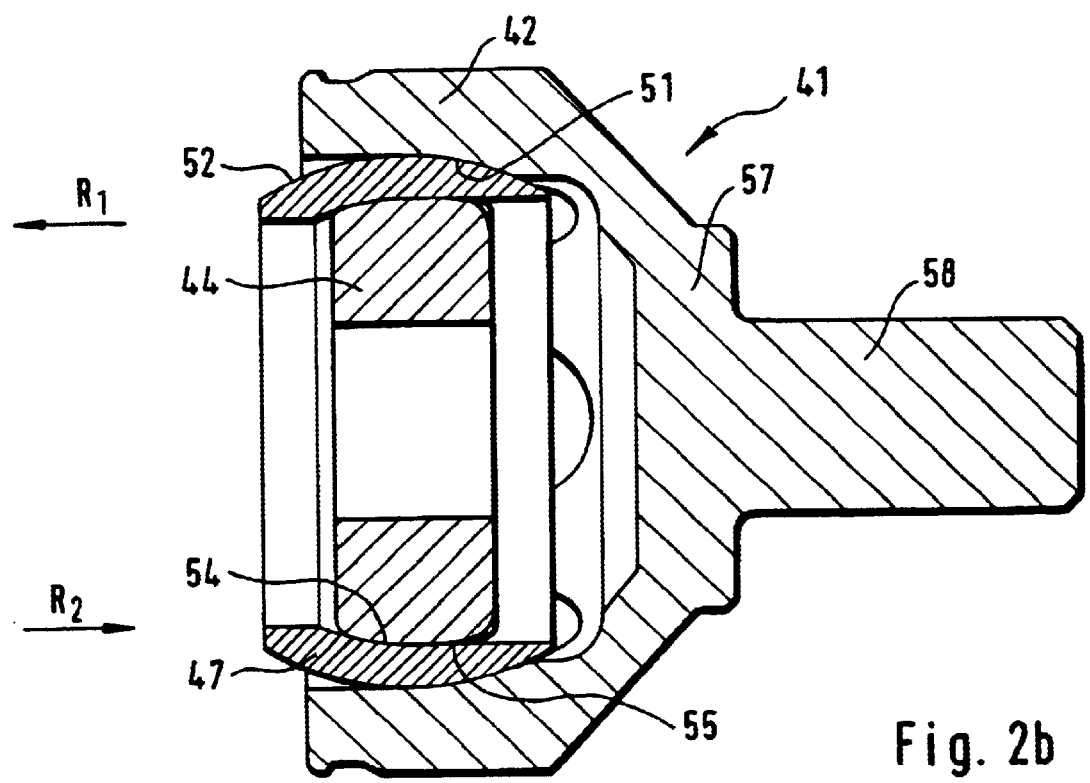

Below, the two illustrations of FIG. 2 will be described jointly. FIG. 2 shows an inventive constant velocity fixed joint 41 having an outer joint part 42, an inner joint part 44, balls $46_1$, $46_2$ and a ball cage 47. The joint is provided in the form of a counter track joint. Thus, first outer ball tracks $49_1$ in the outer joint part 42 and first inner ball tracks $50_1$ in the inner joint part, which tracks hold balls $46_1$, are designed axially oppositely relative to second outer ball tracks $49_2$ in the outer joint part 42 and second inner ball tracks $50_2$ in the inner joint part 44, which tracks hold the second balls $46_2$. The tracks 49, 50 are all non-undercut-free if viewed in the axial direction. The counter-track formation is provided in that the centers of curvature of the track center lines extending parallel relative to the illustrated track base lines, in each of the components 42, 44, are circumferentially alternately offset in the opposite axial direction relative to the central joint plane which is defined by the centers of the balls 46 when the joint is in the aligned position.

In the outer joint part 42, there is provided a stop-and-guiding face 51 for the spherical outer face 52 of the ball cage 47. The stop-and-guiding face 51 is undercut-free if viewed in a second axial direction $R_2$ from left to right. The ball cage 47, in turn, on its inside, is provided with an inner stop-and-guiding face 54 for the spherical outer face 55 of the inner joint part. The stop-and-guiding face 54 is undercut-free if viewed in a first axial direction $R_1$ from right to left. In this way, the inner joint part 44 can be moved into the ball cage 47 from right to left in a coaxial position. Furthermore, the ball cage 47 can be inserted into the outer joint part 42 from the left in a coaxial position. As can be seen from the shape of the tracks, it is thus possible for the outer joint part 42, the ball cage 47 and the inner joint part 44 to be inserted coaxially, whereas the second balls $46_2$ are subsequently mounted in a known way by over-articulating the joint. Thus, an excessively large articulation angle is created between the inner joint part and the outer joint part, with the windows $56_2$ provided for accommodating the second balls $46_2$ fully emerging from the tracks of the outer joint part 44. The joint of the type as illustrated is axially fixed after all the balls $46_1$, $46_2$ have been inserted, without there being any need for further axial securing devices. In this embodiment, the outer joint part 44 includes an integrally formed-on base 57 with a shaft journal 58.

From the foregoing, it can be seen that there has been brought to the art a new and improved constant velocity joint having assembly and manufacturing advantages. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A constant velocity fixed ball joint in the form of a counter track joint, comprising:

an outer joint part with outer tracks;

an inner joint part with inner tracks;

torque transmitting balls which are received in pairs of tracks formed by said outer and inner tracks; and a ball cage with cage windows in which the balls are held in a common plane and are guided on to an angle-bisecting plane when the joint is articulated;

wherein said outer and inner tracks comprise first outer tracks and first inner tracks, together forming first pairs of tracks whose control angles open in a first axial direction ($R_1$) and in which first balls are held; and second outer tracks and second inner tracks, together forming second pairs of tracks whose control angles open in a second axial direction ($R_2$) and in which second balls are held, wherein the control angles are defined as angles between tangents at ball contact points in the tracks; and wherein the outer joint part, on an inside, forms a first stop-and-guiding face for a spherical outer face of the ball cage, said first stop-and-guiding face being undercut-free if viewed in said second axial direction ($R_2$); and wherein the ball cage, on an inside, forms a second stop-and-guiding face for a spherical outer face of the inner joint part, said second stop-and-guiding face being undercut-free if viewed in the first axial direction ($R_1$).

2. A joint according to claim 1, wherein in the second axial direction ($R_2$), the inner joint part, by way of its second inner tracks, is supported on the second balls axially held in the cage windows of the ball cage.

3. A joint according to claim 1, wherein all of the tracks are provided in their respective components in the form of undercut-free tracks.

4. A joint according to claim 1, wherein said first outer tracks and first inner tracks are undercut-free tracks, and said second outer tracks and second inner tracks are non-undercut-free tracks.

5. A joint according to claim 1, wherein all of the tracks are provided in their respective components in the form of non-undercut-free tracks.

6. A joint according to claim 1, wherein the joint is provided in the form of a disc joint whose outer joint part is open at both ends.

7. A joint according to claim 1 comprising an outer joint part having a joint base integrally formed on at one end.

8. A joint according to claim 1, wherein in the first axial direction ($R_1$), the ball cage, by way of its cage windows, is supported on the second balls held in the second outer tracks and in the second inner tracks.

9. A joint according to claim 8, wherein all of the tracks are provided in their respective components in the form of undercut-free tracks.

10. A joint according to claim 8, wherein said first outer tracks and first inner tracks are undercut-free tracks, and said second outer tracks and second inner tracks are non-undercut-free tracks.

11. A joint according to claim 8, wherein all of the tracks are provided in their respective components in the form of non-undercut-free tracks.

12. A joint according to claim 8, wherein the joint is provided in the form of a disc joint whose outer joint part is open at both ends.

13. A joint according to claim 8 comprising an outer joint part having a joint base integrally formed on at one end.

14. A joint according to claim 8, wherein in the second axial direction ($R_2$), the inner joint part, by way of its second inner tracks, is supported on the second balls axially held in the cage windows of the ball cage.

15. A joint according to claim 14, wherein all of the tracks are provided in their respective components in the form of undercut-free tracks.

16. A joint according to claim 14, wherein said first outer tracks and first inner tracks are undercut-free tracks, and said second outer tracks and second inner tracks are non-undercut-free tracks.

17. A joint according to claim 14, wherein all of the tracks are provided in their respective components in the form of non-undercut-free tracks.

18. A joint according to claim 14 comprising an outer joint part having a joint base integrally formed on at one end.

* * * * *